US006522813B2

(12) United States Patent
Rephaeli

(10) Patent No.: US 6,522,813 B2
(45) Date of Patent: Feb. 18, 2003

(54) ALIGNMENT TECHNIQUE FOR OPTICAL FIBER ARRAY

(75) Inventor: Eli Rephaeli, Neve Daniel (IL)

(73) Assignee: Chiaro Networks Ltd., Jerusalem (IL)

( * ) Notice: Subject to any disclaimer, the term of this patent is extended or adjusted under 35 U.S.C. 154(b) by 0 days.

(21) Appl. No.: 09/892,843

(22) Filed: Jun. 28, 2001

(65) Prior Publication Data

US 2003/0002800 A1 Jan. 2, 2003

(51) Int. Cl.[7] .................................................. G02B 6/26
(52) U.S. Cl. ............................. 385/52; 385/97; 385/98
(58) Field of Search ........................... 385/52, 115, 116, 385/59, 65, 97, 98

(56) References Cited

U.S. PATENT DOCUMENTS 6,368,441 B1 * 4/2002 Yamada ...................... 156/178
6,370,302 B2 * 4/2002 Shekel et al. ................. 385/52

* cited by examiner

Primary Examiner—Robert H. Kim
Assistant Examiner—Elizabeth Gemmell
(74) Attorney, Agent, or Firm—Nixon & Vanderhye P.C.

(57) ABSTRACT

Improved apparatus and method allow rapid and precise alignment of a fiber optic array on a substrate, in which the offset between the end faces of the array and the edge of the substrate must be precisely known. The arrangement is adaptable for the construction of microlens assemblies and other optical elements that must be precisely placed proximate the end faces of the optical fibers.

63 Claims, 9 Drawing Sheets

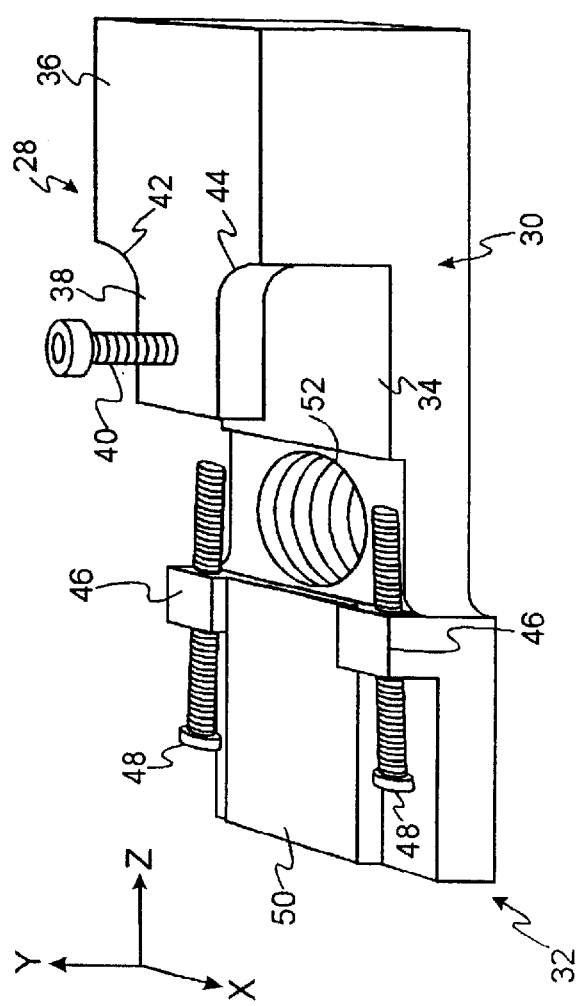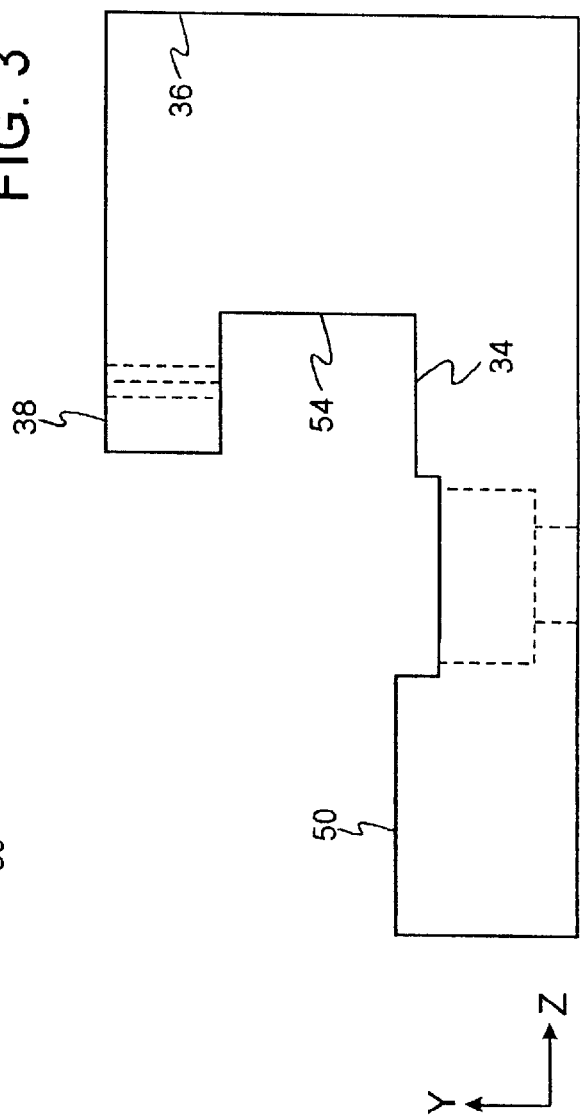

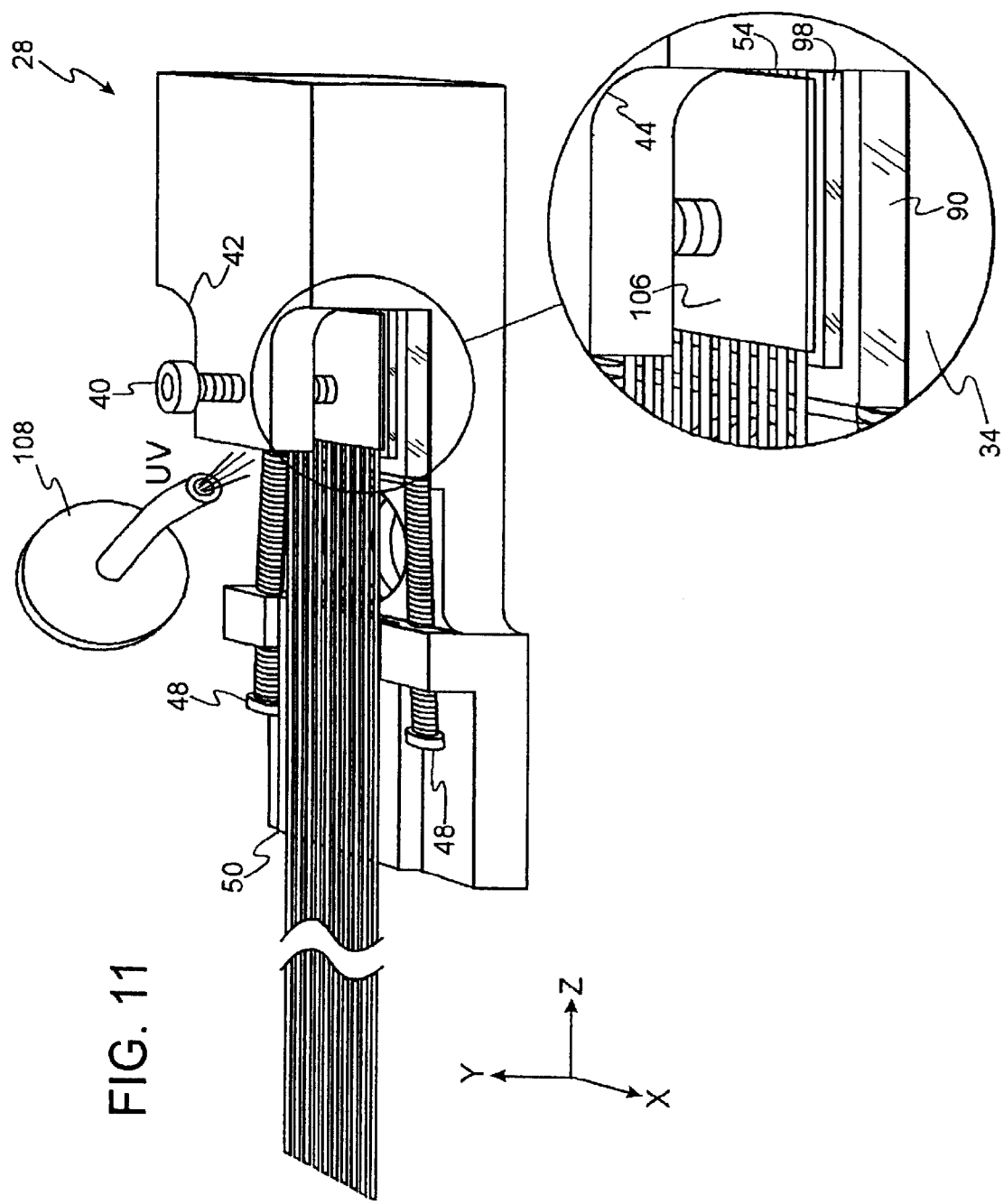

ALIGNMENT TECHNIQUE FOR OPTICAL FIBER ARRAY

BACKGROUND OF THE INVENTION

1. Field of the Invention

This invention relates to alignment of optical devices. More particularly this invention relates to a technique for the axial alignment of the end face of an array of optical fibers with an edge of a support block.

2. Description of the Related Art

In the past, the assembly and manufacture of optical assemblies having a linear array of optical elements has been time consuming and prone to quality control problems. The latest developments in optical cross-connect assemblies have only magnified these problems. Precisely engineered optical receiver arrays are required in these devices. A general demand for more precisely constructed assemblies having greater reliability has translated into a demand for better manufacturing apparatuses and processes.

Optical devices of the type addressed by the present invention currently in use involve an array of optical fibers having light transmitted therethrough. In typical devices the light exiting the end faces of the fibers is transmitted through a plurality of waveguides, which produce a diffraction pattern. The diffracted light is collimated by focusing optics, and then falls on a detector array.

In current devices, it is required to precisely position an assembly of micro-lenses close to the end faces of an optical fiber array.

SUMMARY OF THE INVENTION

It is therefore a primary object of some aspects of the present invention to provide an improved technique for attaching the end of an optical fiber array to a glass block, such that the end faces of the block and the array are in precise alignment.

It is another object of some aspects of the present invention to attach an array of microlenses in precise alignment with corresponding members of an optical fiber array.

The invention provides a method for aligning two blocks, including the steps of placing an end face of a first block in a first face-to-face contacting position against a planar wall, laterally stabilizing the first block in the first face-to-face contacting position, and disposing the bottom surface of a second block in a second face-to-face contacting position with the top surface of the first block, wherein an end face of the second block is in a third face-to-face contacting position with the wall. The method further includes applying pressure against the top surface of the second block while maintaining the second face-to-face contacting position, wherein the pressure is distributed substantially over the top surface of the second block. The method further includes, while applying the pressure, adhering the bottom surface of the second block to the top surface of the first block.

According to an aspect of the method, the pressure is applied by disposing a third block on the top surface of the second block, and applying the pressure to the third block. The third block can be a Delarin block.

Another aspect of the method includes applying an adhesive to the bottom surface of the second block prior to disposing the bottom surface of the second block on the top surface of the first block, and curing the adhesive. The adhesive can be UV glue or an epoxy glue.

According to an additional aspect of the method, the wall has a lower segment and an upper segment that is offset from the lower segment, wherein in the first face-to-face contacting position the end face of the first block contacts the lower segment, and in the second face-to-face contacting position the end face of the second block contacts the upper segment.

According to one aspect of the method, the second block includes an array of optical fibers.

Another aspect of the method includes disposing an array of microlenses on the second block proximate an outlet of the array of optical fibers.

According to a further aspect of the method, the wall includes a first pin and a second pin that is spaced apart from the first pin.

The invention provides a method for aligning an array of optical elements on a block, including the steps of placing an end face of a first block in a first face-to-face contacting position against a planar wall, laterally stabilizing the first block in the first face-to-face contacting position, disposing the bottom surface of a fiberoptic array in a second face-to-face contacting position with a top surface of the first block, wherein an end face of the fiberoptic array is in a third face-to-face contacting position with the wall. The method includes applying pressure against the top surface of the fiberoptic array, while maintaining the second face-to-face contacting position, wherein the pressure is distributed substantially over the top surface of the fiberoptic array, and while applying the pressure, adhering the bottom surface of the fiberoptic array to the top surface of the first block.

According to an aspect of the method, the pressure is applied by disposing a third block on the top surface of the fiberoptic array, and applying the pressure to the third block. The third block may be a Delarin block.

Another aspect of the method includes applying an adhesive to the bottom surface of the fiberoptic array prior to disposing the bottom surface of the fiberoptic array and curing the adhesive. The adhesive may be UV glue or epoxy glue.

According to still another aspect of the method, the wall includes a lower segment and an upper segment that is offset from the lower segment, wherein in the first face-to-face contacting position the end face of the first block contacts the lower segment, and in the second face-to-face contacting position the end face of the fiberoptic array contacts the upper segment.

An additional aspect of the method includes disposing an array of microlenses on the fiberoptic array proximate the end face of the fiberoptic array.

According to one aspect of the method, the wall includes a first pin and a second pin that is spaced apart from the first pin.

The invention provides an apparatus for aligning an optical array, including a receiving section that accepts a first block and an array of optical elements, wherein the array of optical elements includes a second block. The apparatus further includes a retaining section adjacent the receiving section for stabilizing the first block in an operating position, wherein the retaining section includes a platform that carries the first block thereon. The apparatus further includes an upright frame, which has an extension that overhangs the platform, and has a wall that abuts the first block and the second block during alignment thereof. The apparatus further includes a plurality of horizontally directed stabilizers mounted on the retaining section that urge the first block into a first face-to-face contacting position with a lower segment of the wall, and a vertically directed stabilizer mounted on the extension that holds a bottom surface of the second block in face-to-face contact with a top surface of the first block and holds an end face of the second block in a second face-to-face contacting position with an upper segment of the wall.

According to an aspect of the apparatus, the horizontally directed stabilizers each comprise an upright stub having a hole bored therethrough, and a pin inserted through the hole. The pin may be a bolt threaded through the hole.

According to yet another aspect of the apparatus, the vertically directed stabilizer includes a pin inserted through a bore that is formed in the extension. The pin can be a bolt threaded through the bore.

According to still another aspect of the apparatus, the wall includes two upright posts and a gap therebetween.

According to an additional aspect of the apparatus, the lower segment of the wall includes a niche, the end face of which is offset from the upper segment of the wall.

One aspect of the apparatus the lower segment of the wall includes an outstanding step that is offset from the upper segment of the wall.

According to a further aspect of the apparatus, a width dimension of the extension is less than a width dimension of the platform.

The invention provides an apparatus for aligning an optical array, including a receiving section that accepts a first block, and an array of optical elements, wherein the array of optical elements includes a second block. The apparatus further includes a retaining section adjacent the receiving section for stabilizing the first block in an operating position, wherein the retaining section includes a platform for carrying the first block thereon. The apparatus further includes an upright frame having an extension that overhangs the platform, wherein the width dimension of the extension is less than the width dimension of the platform. The apparatus further includes a wall that abuts the first block and the second block during alignment thereof, a plurality of horizontally directed stabilizers mounted on the retaining section that urge the first block into a first face-to-face contacting position with a lower segment of the wall. The horizontally directed stabilizers each comprise an upright stub that has a hole bored therethrough and a first bolt threaded through the hole, and a vertically directed stabilizer mounted on the extension that holds a bottom surface of the second block in face-to-face contact with a top surface of the first block, and holds an end face of the second block in a second face-to-face contacting position with an upper segment of the wall, wherein the vertically directed stabilizer includes a second bolt threaded through a bore that is formed in the extension.

According to an aspect of the apparatus, the wall includes two upright posts an a gap therebetween.

According to an additional aspect of the apparatus, the lower segment of the wall includes a niche that is offset from the upper segment of the wall.

One aspect of the apparatus the lower segment of the wall includes an outstanding step that is offset from the upper segment of the wall.

BRIEF DESCRIPTION OF THE DRAWINGS

For a better understanding of these and other objects of the present invention, reference is made to the detailed description of the invention, by way of example, which is to be read in conjunction with the following drawings, wherein:

FIG. 2 is a perspective view of an alignment apparatus in accordance with a preferred embodiment of the invention;

FIG. 3 is a sectional view of the alignment apparatus shown in FIG. 2 with the bolts removed;

FIG. 11 is a perspective view of the alignment apparatus shown in FIG. 2 with a fiberoptic assembly in place.

DESCRIPTION OF THE PREFERRED EMBODIMENT

In the following description, numerous specific details are set forth in order to provide a thorough understanding of the present invention. It will be apparent however, to one skilled in the art that the present invention may be practiced without these specific details.

In describing the embodiments herein, the following conventions are used. The Z-axis is nominally horizontal, and has the same direction as the optical axes of an array of optical fibers that is being held and manipulated. The X-axis refers to the horizontal axis that is orthogonal to the Z-axis. The Y-axis is the vertical axis, and is orthogonal to both the X-axis and the Z-axis. Rotation about the X-axis, Y-axis, and Z-axis is referred to as theta-X, theta-Y and theta-Z motion respectively. Of course, it is possible to operate the apparatus disclosed herein in many positions and orientations, in which case the X-axis, Y-axis, and Z-axis are appropriately translated.

Alignment Issue

Figure 1:
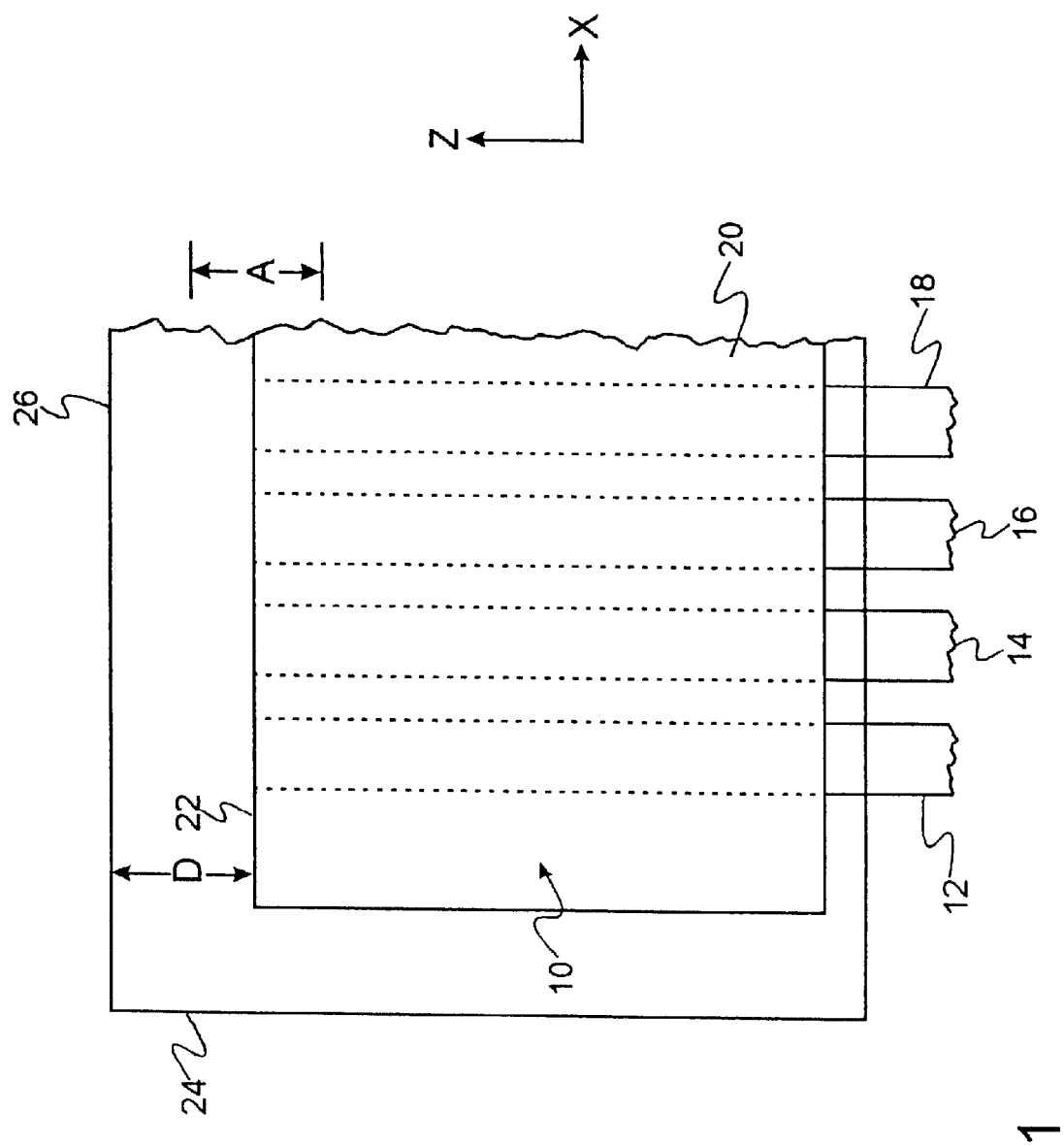
FIG. 1 is a partial top view of an array of optical fibers, which can be aligned in accordance with a preferred embodiment of the invention.

Turning now to the drawings, reference is made to FIG. 1, which illustrates a top view of an array of optical fibers, which can be aligned in accordance with a preferred embodiment of the invention. The array 10 includes a plurality of optical fibers 12, 14, 16, 18, the terminal segments of which are embedded in a substrate 20. The substrate 20 can be a glass block. The array 10 is constructed such that the edge 22 of the substrate 20 and the end faces of the optical fibers 12, 14, 16, 18 are aligned within a tolerance in the Z-axis that is given by the dimension "A". In some manufacturing applications, an assembly of microlenses (not shown) may be positioned near the outlet of the array 10. In order for the assembly of microlenses to function properly with the array 10, the dimension "A" is required to be less than 1 micron. If the tolerance were not met, then the focal points of the microlenses would vary unacceptably in the Z-axis. A supporting block 24 is needed for additional physical support, because the optical fibers 12, 14, 16, 18 of the array 10 are too delicate to support an assembly of microlenses. It is necessary to position the array 10 atop the block 24, and to align the edge 22 of the array 10 in parallel with the edge 26 of underlying block 24, and at a known distance "D" from the edge 26. In some embodiments the distance "D" can be zero.

First Embodiment

Reference is now made to FIG. 2, which illustrates an alignment apparatus for a fiberoptic array that is constructed and operative in accordance with a preferred embodiment of the invention. An alignment apparatus 28 has a receiving section 30 that receives a fiberoptic array to be aligned, and a retaining section 32, which stabilizes the fiberoptic array during its alignment.

The retaining section 32 has a platform 34, which supports the fiberoptic array during alignment. A frame 36 is disposed adjacent the platform 34, The frame 36 has an extension 38 that overhangs the platform 34 and is provided with a retaining bolt 40 threaded therethrough. The purpose of the retaining bolt 40 is to urge the fiber-optic array that is to be aligned against the platform 34, and thereby vertically stabilize it. The extension 38 is narrower than the platform 34. It is thus possible to view the platform 34 from above through two open corners 42, 44 that are formed by the base of the extension 38 and the frame 36. In applications requiring more exacting visual control, it is possible to fabricate the extension 38 from a transparent material.

The retaining section 32 is provided with two laterally disposed stubs 46 that project upward, each supporting a stabilizing bolt 48 threaded therethrough. The stabilizing bolts 48 are substantially horizontally disposed, and are angled inward toward the central axis of the alignment apparatus 28. The stabilizing bolts 48 are used to further stabilize the fiberoptic array that is to be aligned, as will be disclosed in further detail hereinbelow. A staging area 50 disposed intermediate the stabilizing bolts 48 admits the fiberoptic array that is to be aligned into an operational position in the receiving section 30. A hole 52 is threaded through the retaining section 32. It can optionally receive a mounting bolt or screw (not shown), if it is desired to secure the alignment apparatus 28 to an optical stage (not shown) or other working platform. Anodized aluminum is a suitable material for the construction of the alignment apparatus 28.

Reference is now made to FIG. 3, which illustrates a sectional view of the alignment apparatus 28. The platform 34 is bounded by a flat wall 54, which abuts the fiberoptic array that is to be aligned. It is desirable that the wall 54 be precisely planar.

Second Embodiment

Figure 4:
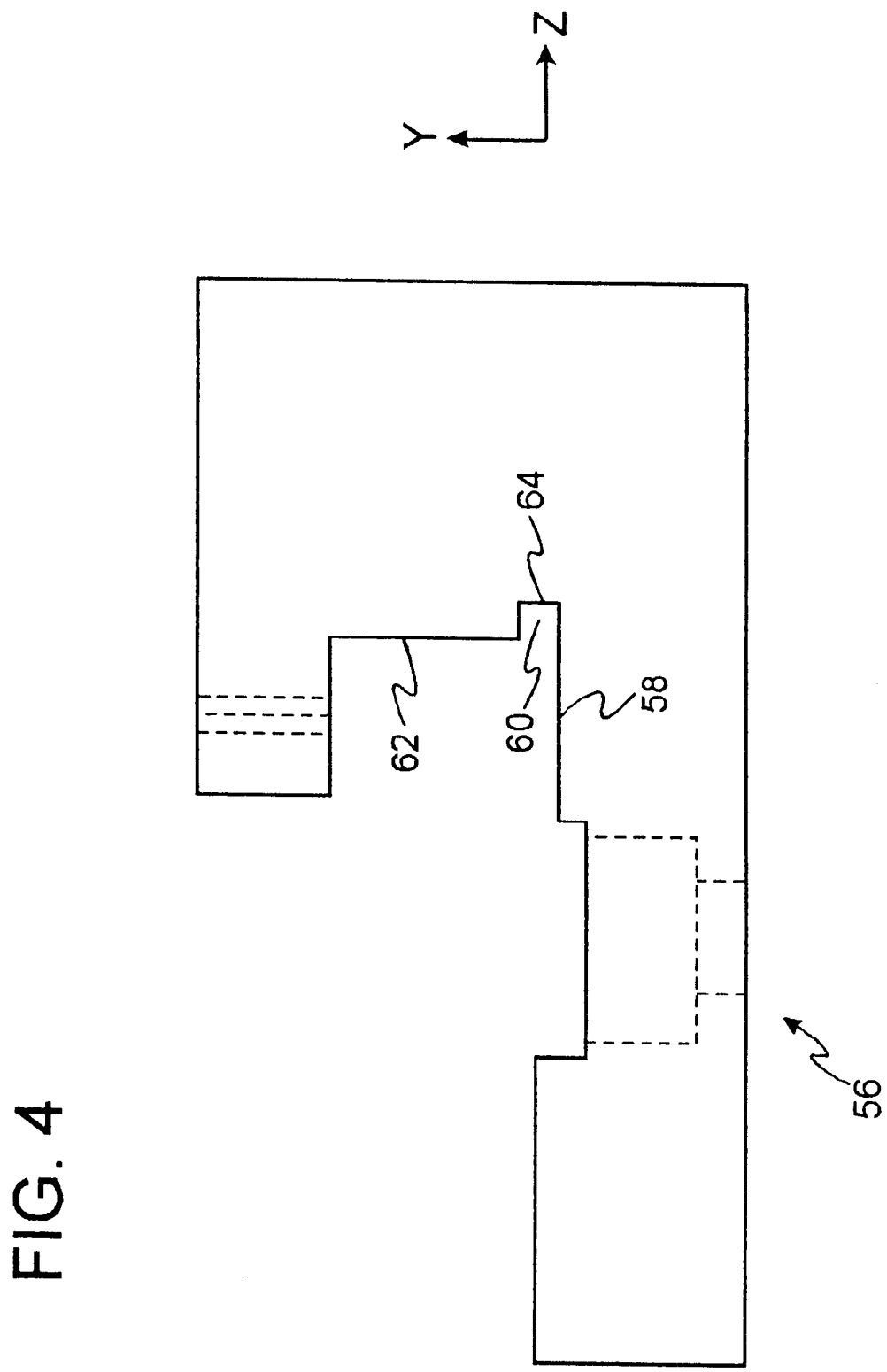
FIG. 4 is a sectional view of an alignment apparatus according to an alternate embodiment of the invention.

Reference is now made to FIG. 4, which illustrates a sectional view of an alignment apparatus that is constructed and operative in accordance with an alternate embodiment of the invention. An alignment apparatus 56 is similar to the alignment apparatus 28 (FIGS. 2, 3), except that a platform 58 is continuous with the floor of a niche 60 that is formed in the lower portion of a wall 62. The niche terminates in a short vertical segment 64. With this embodiment, a lower block can be attached beneath a fiber optic array, and aligned so as to project forward a known distance beyond the end face of the array.

Third Embodiment

Figure 5:
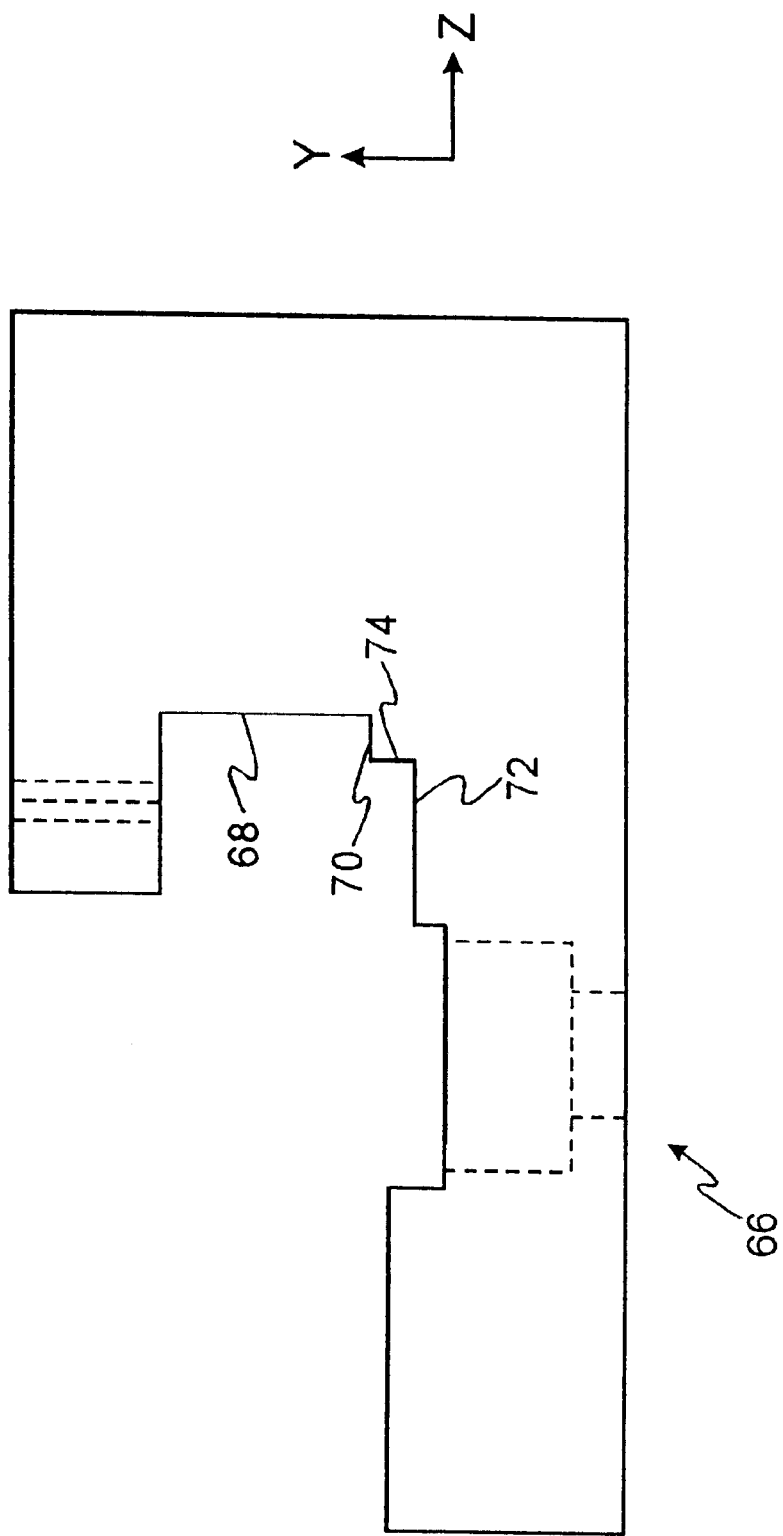
FIG. 5 is a sectional view of an alignment apparatus according to an alternate embodiment of the invention.

Reference is now made to FIG. 5, which illustrates a sectional view of an alignment apparatus that is constructed and operative in accordance with an another alternate embodiment of the invention. An alignment apparatus 66 is similar to the alignment apparatus 28 (FIGS. 2, 3), except that the lower segment of a wall 68 has an outward step or extension 70. A platform 72 terminates at a short vertical segment 74 that forms the free end of the extension 70. With this embodiment, an underlying block can be attached beneath a fiber optic array or another block, and aligned such that the end face of the overlying fiber optic array or other block projects forward a known distance beyond the end face of the underlying block.

Fourth Embodiment

Figure 6:
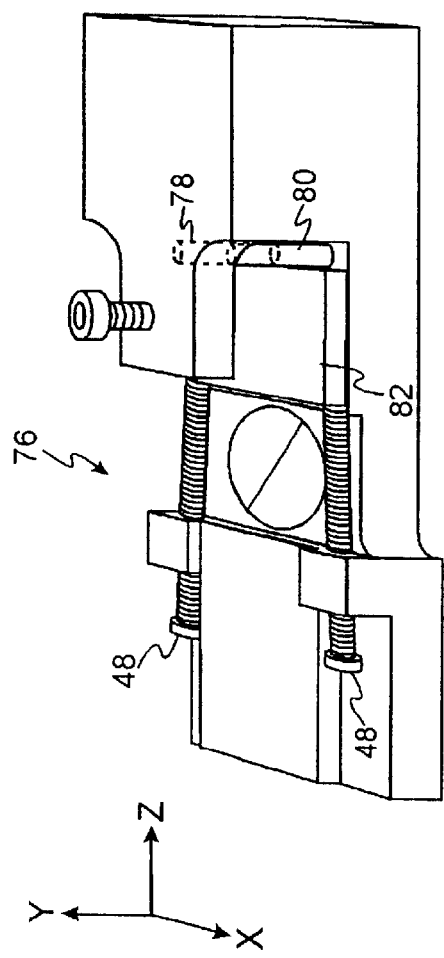
FIG. 6 is a perspective view of an alignment apparatus according an alternate embodiment of the invention.

Reference is now made to FIG. 6, which is a perspective view of an alignment apparatus that is constructed and operative in accordance with another alternate embodiment of the invention. An alignment apparatus 76 is similar to the alignment apparatus 28 (FIGS. 2, 3), except that that two upright pins 78, 80 are disposed at the end of a platform 82.

Figure 7:
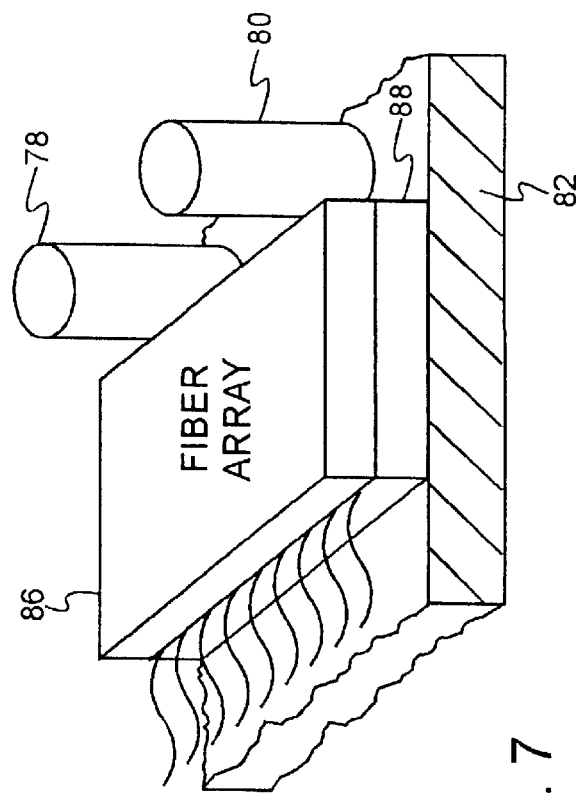
FIG. 7 is an enlarged view of a portion of the alignment apparatus shown in FIG. 6.

Reference is now made to FIG. 7, which is an enlarged schematic view of a portion of an alignment apparatus similar to that shown in FIG. 6. A fiber-optic array is shown in alignment position. The fiber-optic array has a top block 86 mounted on a bottom block 88. During alignment, the block 86 and the block 88 are both in held in firm contact with the pins 78, 80 by pressure exerted by the stabilizing bolts 48 (FIG. 6). The difference between the embodiment illustrated in FIG. 2 and FIG. 3, and the embodiment of FIG. 6 and FIG. 7 is that the function of the wall 54 (FIG. 3) is carried out by the pins 78, 80. The embodiment of FIG. 7 can be successfully operated even if the blocks 86, 88 have an imperfect planar end face.

Operation

Figure 8:
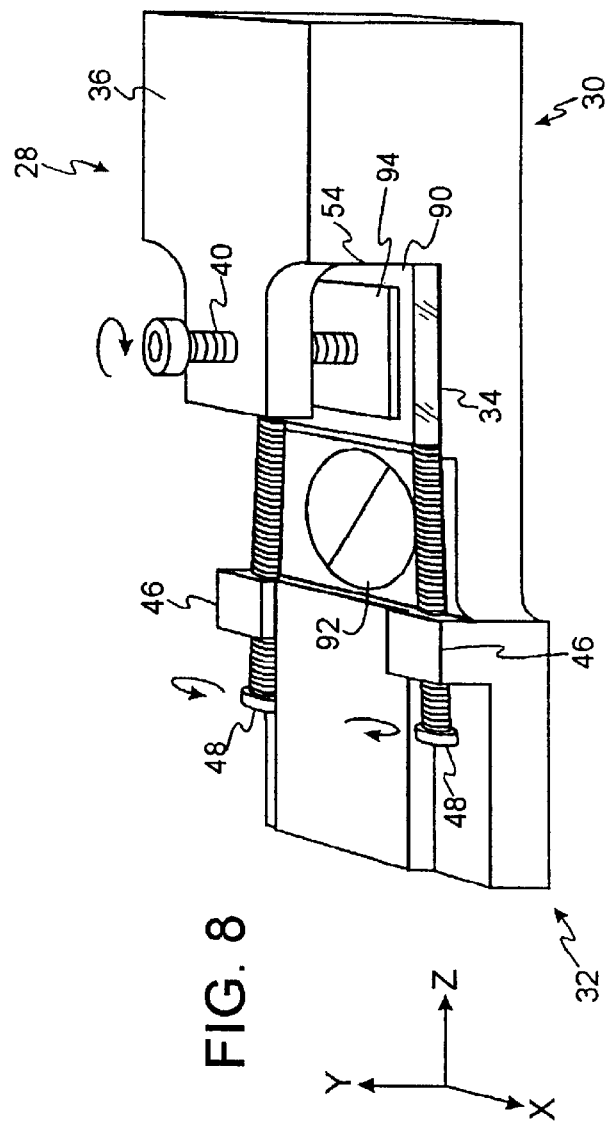
FIG. 8, is a perspective view of the alignment apparatus shown in FIG. 2 with a glass block in a working position.

Operation of the alignment apparatus will now be disclosed with reference to the first embodiment. Reference is now made to FIG. 8, which is a perspective view of the alignment apparatus 28 (FIG. 2). It is convenient to orient the alignment apparatus 28 diagonally on the optical table (not shown), such that the wall 54 faces a corner of the optical table. Preferably, a stereo microscope (not shown) is positioned above the alignment apparatus 28 in order to view the alignment operation from above. The procedure can be viewed from the side using direct vision. A video camera (not shown) may optionally be positioned to view the alignment apparatus 28 from the side.

A glass block 90 is in a working position on the platform 34. A mounting screw 92 secures the alignment apparatus 28 to an optical table (not shown). Prior to mounting the glass block 90, the surfaces of the alignment apparatus 28 that come into contact with the surfaces of the fiberoptic array that is to be aligned are cleaned with a suitable cleaning substance. It is desirable to meticulously clean the surfaces of the fibers of the fiberoptic array that is to be aligned, and the surfaces of the glass block 90.

A Delarin block 94 which is preferably less than 5 millimeters in thickness is set atop the glass block 90, and the retaining bolt 40 is gently tightened against the Delarin block 94. A glass block can be used instead of the Delarin block 94, provided that its face is accurately planar. Interposition of the Delarin block 94 between the retaining bolt 40 and the glass block 90 uniformly distributes the pressure produced by the retaining bolt 40 over the glass block 90. The stabilizing bolts 48 are then tightened to urge the glass block 90 against the wall 54. The alignment apparatus 28 is constantly viewed from the side, and from above through the stereo microscope (not shown) as the retaining bolt 40 and the stabilizing bolts 48 are tightened, in order to assure that the end face of the glass block 90 is accurately positioned in face-to-face contact with the wall 54.

Figure 9:
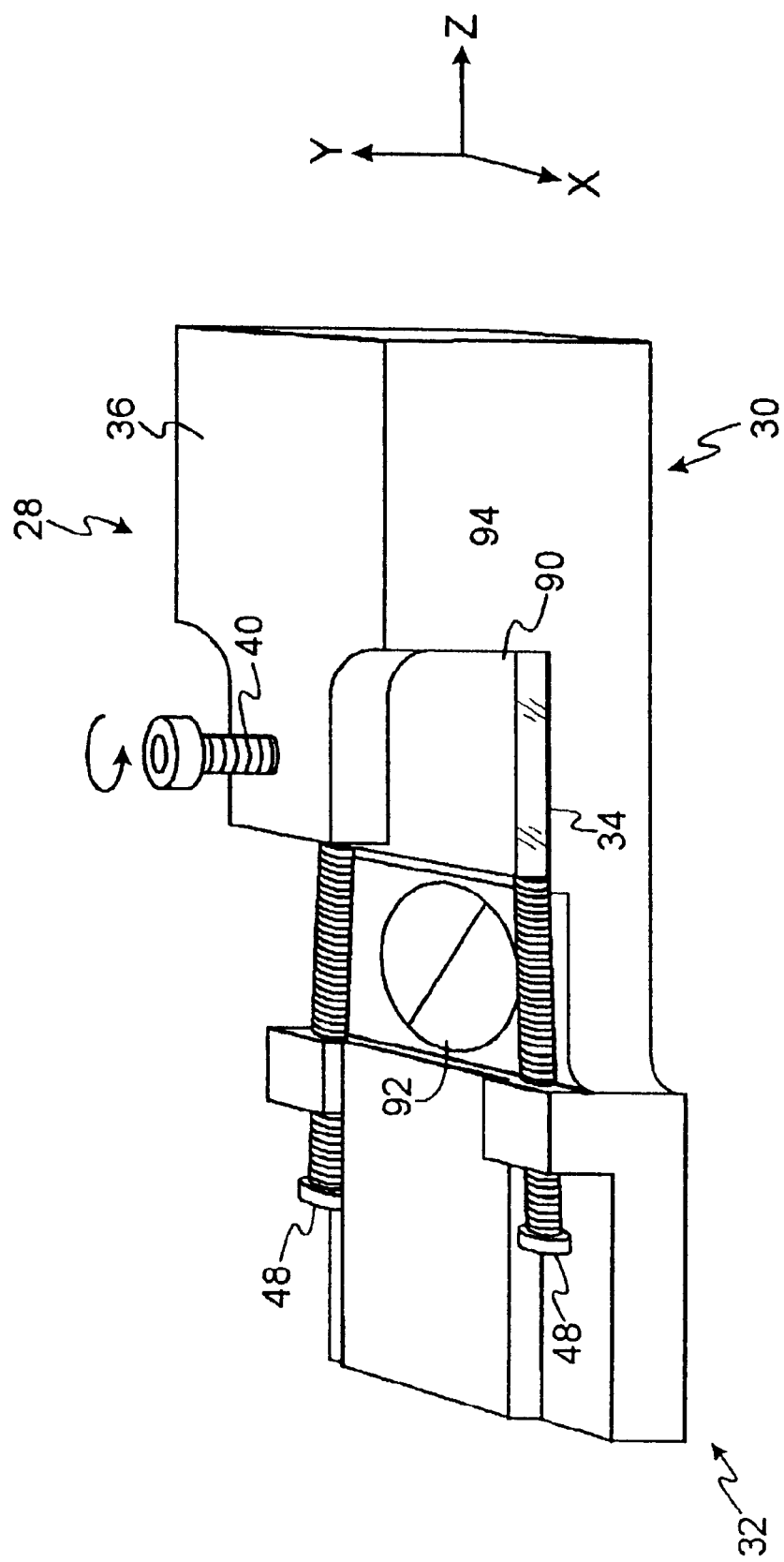
FIG. 9, is a perspective view of the alignment apparatus similar to FIG. 8.

Reference is now made to FIG. 9, which is a perspective view of the alignment apparatus 28 (FIG. 2). The description of FIG. 9 is to be read in conjunction with the disclosure of the next stage in the alignment operation and with FIG. 8. The retaining bolt 40 is released, and the Delarin block 94 is removed. The glass block 90 continues to be stabilized by the stabilizing bolts 48.

Figure 10:
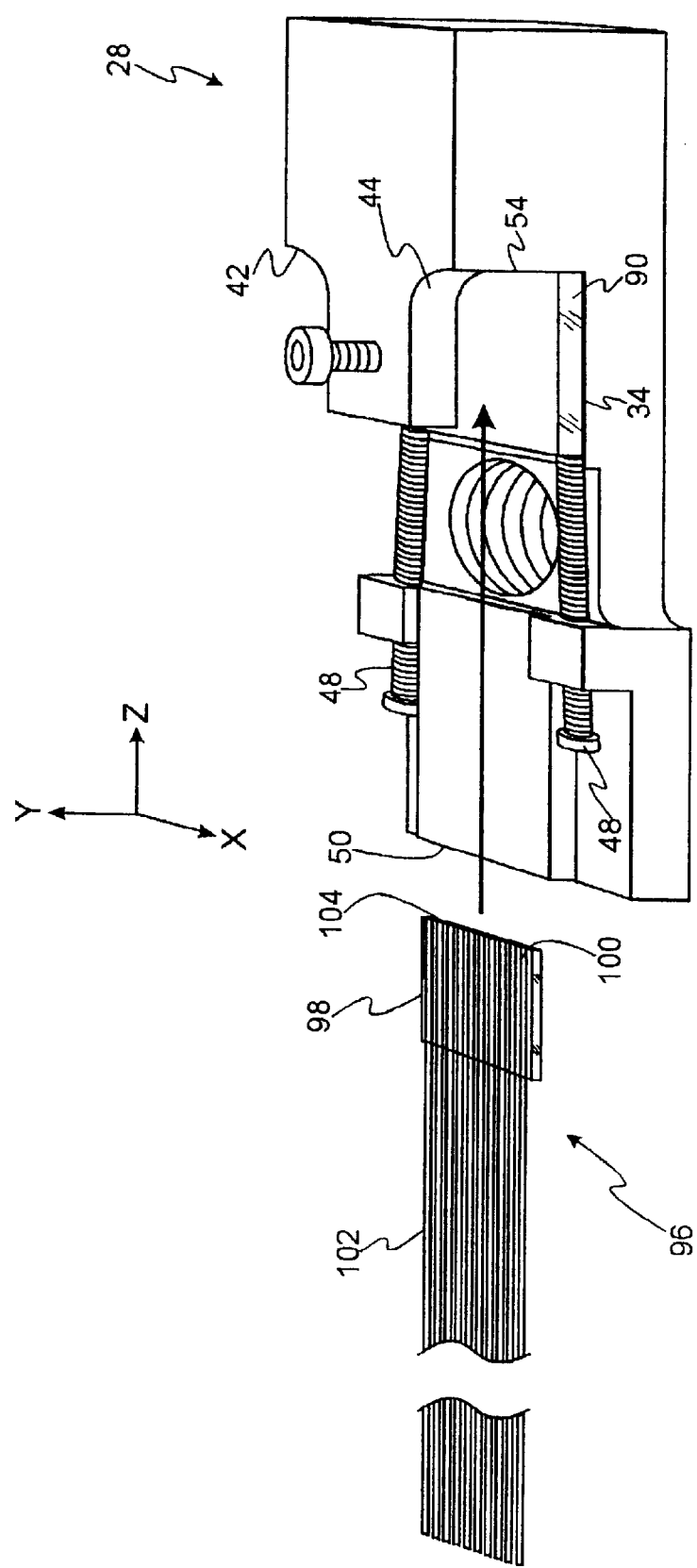
FIG. 10 is a perspective view of the alignment apparatus shown in FIG. 2 with a fiberoptic assembly ready for placement therein for alignment.

Reference is now made to FIG. 10, which is a perspective view of the alignment apparatus 28 (FIG. 2), and illustrates a fiberoptic array that is to be aligned. The description of FIG. 10 is to be read in conjunction with the disclosure of the next stage in the alignment operation and with FIG. 9. A fiberoptic array 96 comprises a glass plate 98 that encloses the terminal segments 100 of a plurality of optical fibers 102. A thin layer of UV-glue is spread over the glass plate 98, taking care that the glue does not extend closer than 2 mm. to the end faces 104 of the optical fibers 102. Restricting the placement of the glue in this manner is desirable in order to prevent the glue from obscuring the end faces 104. A glue such as UV-81, available from Norland Co., is suitable. It is important that the UV-glue be applied to the glass plate 98, and not to the glass block 90. Other glues, such as epoxy, can be substituted for the UV-glue.

Reference is now made to FIG. 11, which is a perspective view of the alignment apparatus 28 (FIG. 2), and illustrates a fiberoptic array during a further stage of its alignment. The description of FIG. 11 is to be read in conjunction with the disclosure of the next stage in the alignment operation and with FIG. 10. The fiberoptic array 96 is passed into the alignment apparatus 28 over the staging area 50, until the end faces 104 of the optical fibers 102 are near the wall 54. The top surface of the glass block 90 and the bottom surface of the glass plate 98 are then in face-to-face contact. While viewing the procedure from above through the corners 42, 44, using the stereo microscope (not shown), the end faces 104 are urged against the wall 54 until they are in firm contact with the wall 54. The fiberoptic array 96 is manually held in position, while a Delarin block 106 is placed atop the glass plate 98. The Delarin block 106 is preferably less than 5 mm. in thickness, and slightly smaller than the glass plate 98 in order to continue to view the glass plate 98 from above. Then the retaining bolt 40 is gently tightened against the Delarin block 106. Interposition of the Delarin block 106 between the retaining bolt 40 and the glass plate 98 uniformly distributes the pressure produced by the retaining bolt 40 over the glass plate 98 and the glass block 90.

A UV gun 108 is then directed horizontally toward the side of the glass and the glass block 90, which are then exposed to ultraviolet light for about a minute. After loosening the stabilizing bolts 48, the fiberoptic array is then removed from the alignment apparatus 28 and the entire glue-containing area exposed to the UV gun for an additional four minutes, in order for the glue to harden.

Figure 12:
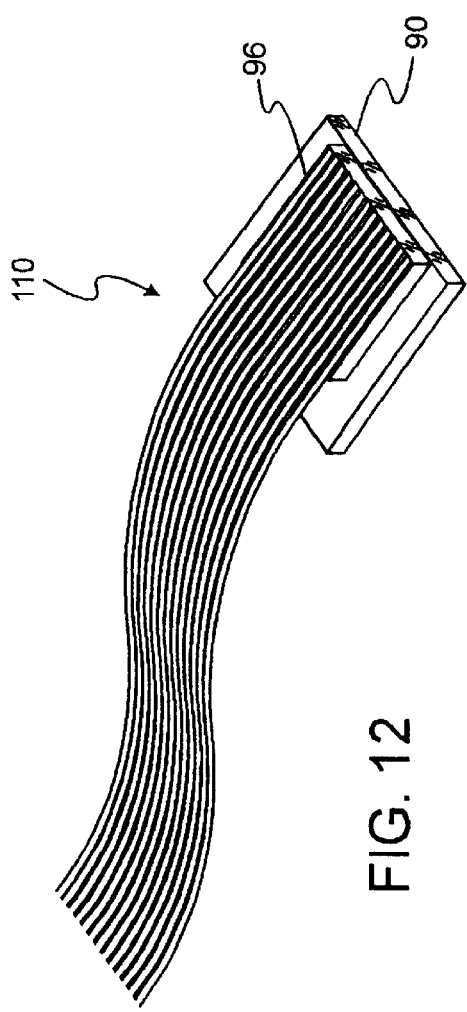
FIG. 12 illustrates a fiberoptic assembly, which has been completed according to a preferred embodiment of the invention.

Reference is now made to FIG. 12, which illustrates a completed assembly 110, comprising the fiberoptic array 96, now mounted on and properly aligned with the glass block 90.

While this invention has been explained with reference to the structure disclosed herein, it is not confined to the details set forth, and this application is intended to cover any modifications and changes as may come within the scope of the following claims:

1. An apparatus for aligning an optical array, comprising:
   a receiving section that accepts a first block, and an array of optical elements, wherein said array of optical elements comprises a second block; and
   a retaining section adjacent said receiving section for stabilizing said first block in an operating position, wherein said retaining section comprises:
   a platform for carrying said first block thereon;
   an upright frame having an extension that overhangs said platform;
   a wall that abuts said first block and said second block during alignment thereof;
   a plurality of horizontally directed stabilizers mounted on said retaining section that urge said first block into a first face-to-face contacting position with a lower segment of said wall; and
   a vertically directed stabilizer mounted on said extension that holds a bottom surface of said second block in face-to-face contact with a top surface of said first block and holds an end face of said second block in a second face-to-face contacting position with an upper segment of said wall.

2. The apparatus according to claim 1, wherein said horizontally directed stabilizers each comprise an upright stub having a hole bored therethrough and a pin inserted through said hole.

3. The apparatus according to claim 2, wherein said pin is a bolt threaded through said hole.

4. The apparatus according to claim 1, wherein said vertically directed stabilizer comprises a pin inserted through a bore that is formed in said extension.

5. The apparatus according to claim 4, wherein said pin comprises a bolt threaded through said bore.

6. The apparatus according to claim 1, wherein said wall comprises two upright posts and a gap therebetween.

7. The apparatus according to claim 1, wherein said lower segment of said wall comprises a niche that is offset from said upper segment of said wall.

8. The apparatus according to claim 1, wherein said lower segment of said wall comprises an outstanding step that is offset from said upper segment of said wall.

9. The apparatus according to claim 1, wherein a width dimension of said extension is less than a width dimension of said platform.

10. An apparatus for aligning an optical array, comprising:
    a receiving section that accepts a first block, and an array of optical elements, wherein said array of optical elements comprises a second block; and
    a retaining section adjacent said receiving section for stabilizing said first block in an operating position, wherein said retaining section comprises:
    a platform for carrying said first block thereon;
    an upright frame having an extension that overhangs said platform, a width dimension of said extension being less than a width dimension of said platform;
    a wall that abuts said first block and said second block during alignment thereof;
    a plurality of horizontally directed stabilizers mounted on said retaining section that urge said first block into a first face-to-face contacting position with a lower segment of said wall; wherein said horizontally directed stabilizers each comprise an upright stub having a hole bored therethrough and a first bolt threaded through said hole; and
    a vertically directed stabilizer mounted on said extension that holds a bottom surface of said second block in face-to-face contact with a top surface of said first block and holds an end face of said second block in a second face-to-face contacting position with an upper segment of said wall, wherein said vertically directed stabilizer comprises a second bolt threaded through a bore that is formed in said extension.

11. The apparatus according to claim 10, wherein said wall comprises two upright posts and a gap therebetween.

12. The apparatus according to claim 10, wherein said lower segment of said wall comprises a niche that is offset from said upper segment of said wall.

13. The apparatus according to claim 10, wherein said lower segment of said wall comprises an outstanding step that is offset from said upper segment of said wall.

14. A method for aligning an optical assembly, comprising:
   placing an end face of a first block in a first face-to-face contacting position against a planar wall;
   laterally stabilizing said first block in said first face-to-face contacting position;
   disposing a bottom surface of an array of optical elements in a second face-to-face contacting position with a top surface of said first block, wherein an end face of said array of optical elements is in a third face-to-face contacting position with said wall;
   while maintaining said second face-to-face contacting position applying a pressure against a top surface of said array of optical elements, wherein said pressure is distributed substantially over said top surface of said array of optical elements; and
   while performing said step of applying said pressure, adhering said bottom surface of said array of optical elements to said top surface of said first block;
   wherein said wall comprises a lower segment and an upper segment that is offset from said lower segment, wherein in said first face-to-face contacting position said end face of said first block contacts said lower segment, and in said second face-to-face contacting position said end face of said array of optical elements contacts said upper segment.

15. The method according to claim 14, wherein said step of applying said pressure is performed by:
   disposing a third block on said top surface of said array of optical elements; and
   applying said pressure to said third block.

16. The method according to claim 15, wherein said third block is a Delarin block.

17. The method according to claim 14, further comprising applying an adhesive to said bottom surface of said array of optical elements prior to performing said disposing of said bottom surface of said array of optical elements in a second face-to-face contacting position;
   wherein said step of adhering comprises said adhesive.

18. The method according to claim 17, wherein said adhesive is a UV glue.

19. The method according to claim 17, wherein said adhesive is an epoxy glue.

20. The method according to claim 14, wherein said array of optical elements comprises an array of optical fibers.

21. The method according to claim 20, further comprising disposing an array of microlenses on said first block proximate an outlet of said array of optical fibers.

22. The method according to claim 14, wherein said wall comprises a first pin and a second pin that is spaced apart from said first pin.

23. A method for aligning an optical assembly, comprising:
   placing an end face of a first block in a first face-to-face contacting position against a planar wall;
   laterally stabilizing said first block in said first face-to-face contacting position;
   disposing a bottom surface of an array of optical elements, said array of optical elements comprising an array of optical fibers, in a second face-to-face contacting position with a top surface of said first block, wherein an end face of said array of optical elements is in a third face-to-face contacting position with said wall;
   while maintaining said second face-to-face contacting position applying a pressure against a top surface of said array of optical elements, wherein said pressure is distributed substantially over said top surface of said array of optical elements;
   while performing said step of applying said pressure, adhering said bottom surface of said array of optical elements to said top surface of said first block; and
   disposing an array of microlenses on said first block proximate an outlet of said array of optical fibers.

24. The method according to claim 23, wherein said applying of said pressure is performed by:
   disposing a third block on said top surface of said array of optical elements; and
   applying said pressure to said third block.

25. The method according to claim 24, wherein said third block is a Delarin block.

26. The method according to claim 23, further comprising applying an adhesive to said bottom surface of said array of optical elements prior to performing said step of disposing said bottom surface of said array of optical elements;
   wherein said step of adhering comprises curing said adhesive.

27. The method according to claim 26, wherein said adhesive is a UV glue.

28. The method according to claim 26, wherein said adhesive is an epoxy glue.

29. The method according to claim 23, wherein said wall comprises a lower segment and an upper segment that is offset from said lower segment, wherein in said first face-to-face contacting position said end face of said first block contacts said lower segment, and in said second face-to-face contacting position said end face of said array of optical elements contacts said upper segment.

30. The method according to claim 23, wherein said wall comprises a first pin and a second pin that is spaced apart from said first pin.

31. A method for aligning an optical assembly, comprising:
   placing an end face of a first block in a first face-to-face contacting position against a planar wall;
   laterally stabilizing said first block in said first face-to-face contacting position;
   disposing a bottom surface of an array of optical elements in a second face-to-face contacting position with a top surface of said first block, wherein an end face of said array of optical elements is in a third face-to-face contacting position with said wall;
   while maintaining said second face-to-face contacting position applying a pressure against a top surface of said array of optical elements, wherein said pressure is distributed substantially over said top surface of said array of optical elements; and
   while performing said step of applying said pressure, adhering said bottom surface of said array of optical elements to said top surface of said first block,
   wherein said wall comprises a first pin and a second pin that is spaced apart from said first pin.

32. The method according to claim 31, wherein said step of applying said pressure is performed by:
   disposing a third block on said top surface of said array of optical elements; and
   applying said pressure to said third block.

33. The method according to claim 32, wherein said third block is a Delarin block.

34. The method according to claim 31, further comprising applying an adhesive to said bottom surface of said array of optical elements prior to performing said step of disposing said bottom surface of said array of optical elements;

wherein said step of adhering comprises curing said adhesive.

35. The method according to claim 34, wherein said adhesive is a UV glue.

36. The method according to claim 34, wherein said adhesive is an epoxy glue.

37. The method according to claim 31, wherein said wall comprises a lower segment and an upper segment that is offset from said lower segment, wherein in said first face-to-face contacting position said end face of said first block contacts said lower segment, and in said second face-to-face contacting position said end face of said array of optical elements contacts said upper segment.

38. The method according to claim 31, wherein said array of optical elements comprises an array of optical fibers.

39. The method according to claim 38, further comprising disposing an array of microlenses on said first block proximate an outlet of said array of optical fibers.

40. A method for aligning an array of optical elements on a block, comprising:

placing an end face of a first block in a first face-to-face contacting position against a planar wall;

laterally stabilizing said first block in said first face-to-face contacting position;

disposing a bottom surface of a fiberoptic array in a second face-to-face contacting position with a top surface of said first block, wherein an end face of said fiberoptic array is in a third face-to-face contacting position with said wall;

while maintaining said second face-to-face contacting position applying a pressure against a top surface of said fiberoptic array, wherein said pressure is distributed substantially over said top surface of said fiberoptic array, and while performing said step of applying said pressure, adhering said bottom surface of said fiberoptic array to said top surface of said first block, wherein said wall comprises a lower segment and an upper segment that is offset from said lower segment, wherein in said first face-to-face contacting position said end face of said first block contacts said lower segment, and in said second face-to-face contacting position said end face of said fiberoptic array contacts said upper segment.

41. The method according to claim 40, wherein said step of applying said pressure is performed by:

disposing a third block on said top surface of said fiberoptic array; and applying said pressure to said third block.

42. The method according to claim 40, wherein said third block is a Delarin block.

43. The method according to claim 40, further comprising applying an adhesive to said bottom surface of said fiberoptic array prior to performing said step of disposing said bottom surface of said fiberoptic array;

wherein said step of adhering comprises curing said adhesive.

44. The method according to claim 43, wherein said adhesive is a UV glue.

45. The method according to claim 43, wherein said adhesive is an epoxy glue.

46. The method according to claim 40, further comprising disposing an array of microlenses on said fiberoptic array proximate said end face of said fiberoptic array.

47. The method according to claim 40, wherein said wall comprises a first pin and a second pin that is spaced apart from said first pin.

48. A method for aligning an array of optical elements on a block, comprising:

placing an end face of a first block in a first face-to-face contacting position against a planar wall;

laterally stabilizing said first block in said first face-to-face contacting position;

disposing a bottom surface of a fiberoptic array in a second face-to-face contacting position with a top surface of said first block, wherein an end face of said fiberoptic array is in a third face-to-face contacting position with said wall;

while maintaining said second face-to-face contacting position applying a pressure against a top surface of said fiberoptic array, wherein said pressure is distributed substantially over said top surface of said fiberoptic array;

while performing said step of applying said pressure, adhering said bottom surface of said fiberoptic array to said top surface of said first block; and disposing an array of microlenses on said fiberoptic array proximate said end face of said fiberoptic array.

49. The method according to claim 48, wherein said step of applying said pressure is performed by:

disposing a third block on said top surface of said fiberoptic array; and applying said pressure to said third block.

50. The method according to claim 49, wherein said third block is a Delarin block.

51. The method according to claim 48, comprising applying an adhesive to said bottom surface of said fiberoptic array prior to performing said step of disposing said bottom surface of said fiberoptic array;

wherein said step of adhering comprises curing said adhesive.

52. The method according to claim 51, wherein said adhesive is a UV glue.

53. The method according to claim 51, wherein said adhesive is an epoxy glue.

54. The method according to claim 48, wherein said wall comprises a lower segment and an upper segment that is offset from said lower segment, wherein in said first face-to-face contacting position said end face of said first block contacts said lower segment, ad in said second face-to-face contacting position said end face of said fiberoptic array contacts said upper segment.

55. The method according to claim 48, wherein said wall comprises a first pin and a second pin that is spaced apart from said first pin.

56. A method for aligning an array of optical elements on a block, comprising:

placing an end face of a first block in a first face-to-face contacting position against a planar wall;

laterally stabilizing said first block in said first face-to-face contacting position;

disposing a bottom surface of a fiberoptic array in a second face-to-face contacting position with a top surface of said first block, wherein an end face of said fiberoptic array is in a third face-to-face contacting position with said wall;

while maintaining said second face-to-face contacting position applying a pressure against a top surface of said fiberoptic array, wherein said pressure is distributed substantially over said top surface of said fiberoptic array; and while performing said step of applying said pressure, adhering said bottom surface of said fiberoptic array to said top surface of said first block;

wherein said wall comprises a first pin and a second pin that is spaced apart from said first pin.

57. The method according to claim 56, wherein said step of applying said pressure is performed by:

disposing a third block on said top surface of said fiberoptic array; and applying said pressure to said third block.

58. The method according to claim 57, wherein said third block is a Delarin block.

59. The method according to claim 56, further comprising applying an adhesive to said bottom surface of said fiberoptic array prior to performing said step of disposing said bottom surface of said fiberoptic array;

wherein said step of adhering comprises curing said adhesive.

60. The method according to claim 59, wherein said adhesive is a UV glue.

61. The method according to claim 59, wherein said adhesive is an epoxy glue.

62. The method according to claim 56, wherein said wall comprises a lower segment and an upper segment that is offset from said lower segment, wherein in said first face-to-face contacting position said end face of said first block contacts said lower segment, and in said second face-to-face contacting position said end face of said fiberoptic array contacts said upper segment.

63. The method according to claim 56, further comprising disposing an array of microlenses on said fiberoptic array proximate said end face of said fiberoptic array.

* * * * *